United States Patent [19]
Pasquale et al.

[11] 3,881,082
[45] Apr. 29, 1975

[54] ASSEMBLY APPARATUS

[75] Inventors: Robert H. Pasquale, Peabody; John O'Hare, Needham, both of Mass.

[73] Assignee: The Gillette Company, Gillette Park, Mass.

[22] Filed: Apr. 29, 1974

[21] Appl. No.: 464,820

[52] U.S. Cl. .................. 219/79; 29/467; 30/346.58; 219/80; 219/87; 219/158; 219/161; 228/6
[51] Int. Cl. ............................................ B23k 9/12
[58] Field of Search .................. 29/467, 468, 471.3; 30/346.58, 346.60; 219/79, 80, 87, 158, 161; 228/4, 6

[56] References Cited
UNITED STATES PATENTS

| | | | |
|---|---|---|---|
| 1,566,674 | 12/1925 | Horta | 219/158 X |
| 2,794,252 | 6/1957 | Plesch | 30/346.58 |
| 2,913,567 | 11/1959 | Stolz | 219/79 |
| 3,552,630 | 1/1971 | Dean | 219/161 X |
| 3,732,611 | 5/1973 | Watanabe | 29/467 |

Primary Examiner—J. V. Truhe
Assistant Examiner—N. D. Herkamp

[57] ABSTRACT

Apparatus for assembling a blade unit comprises support structure for receiving and holding in aligned position, a first blade component, first aligning structure for applying an aligning force to the first blade component to maintain its cutting edge in predetermined position, second aligning structure for applying an aligning force to a second blade component disposed on the first blade component to maintain its cutting edge in predetermined position offset from the cutting edge of the first blade component, structure for bonding the two blade components permanently together, transfer structure for releasing the aligning forces and transferring the assembled blade unit from the support structure, and common drive structure for operating the aligning, bonding and transfer structures in coordinated relation to align and bond the blade components to form the blade unit.

19 Claims, 17 Drawing Figures

PATENTED APR 29 1975 3,881,082

ASSEMBLY APPARATUS

SUMMARY OF INVENTION

This invention relates to assembly apparatus and more particularly to apparatus for assembling razor blade units.

It is known that certain dual cutting edge shaving systems provide superior shaving characteristics. In such a shaving system two cutting edges are disposed parallel to one another in spaced relation to provide leading and following cutting edges arranged so that both cutting edges are successively active and dynamically cooperate in the cutting of hair elements during a shaving stroke. The geometric arrangement of the cutting edges must be established with precision for the desired superior quality and uniformity of shaving results. It is an object of this invention to provide novel and improved apparatus for assembling blade units. Such apparatus must be capable of operation at commercial production rates and provide blade units in which the blade edges are accurately aligned and without damage to the exposed blade edges. The apparatus should assemble the blade units in a simple and efficient manner with assurance that the blade unit components are permanently secured together with the requisite precision.

Another object of the invention is to provide apparatus for assembling blade units of the type shown in copending application Ser. No. 287,335, entitled "A Plural Edge Blade Unit," filed Sept. 8, 1972 and assigned to the same assignee as this application. Such blade units are designed for use with a conventional injector type razor and include two cutting edges that are disposed in fixed parallel accurately spaced relation to one another so that both cutting edges are successively active with respect to the cutting of a single hair element during a single shaving stroke. Still another object of the invention is to provide automated apparatus for assembly of blade units in an economical, efficient and rapid manner.

In accordance with the invention there is provided apparatus for assembling blade units having a plurality of blade components. The apparatus includes support structure for receiving and holding in aligned position a first blade component, first aligning structure for applying an aligning force to the first blade component to maintain its cutting edge in predetermined position, second aligning structure for applying an aligning force to a second blade component disposed on the first blade component to maintain its cutting edge in predetermined position offset from the cutting edge of the first blade component, apparatus for bonding the two blade components permanently together, transfer structure for releasing the aligning forces and transferring the assembled blade unit from the support structure, and common drive structure for operating the aligning and transfer structures and the bonding apparatus in coordinated relation to align and bond the blade components to form the blade unit.

A particular blade unit employs two stainless steel blade elements each about one and one-half inches long and the blade edges must be maintained parallel with an accuracy of plus or minus 0.0015 inch. This accuracy of parallelism is in both the vertical and horizontal planes. Further, the assembly apparatus must not damage the delicate sharpened shaving edge portions of the blades. While a number of mechanisms for securing the blades permanently together in this geometrical relationship may be employed, welding is an efficient and economical process. However, welding unless carefully controlled may introduce distortions of the metal stock or cause displacement of one member relative to the other and thus produce a defective blade unit.

In accordance with a further feature of the invention, in assembly the blades are secured without distortion or damage, the shaving edges being held parallel to one another in both horizontal or vertical planes in a system in which the elements are successively loaded rapidly and efficiently, welded together and then the resulting blade unit is unloaded without blade edge damage and which does not require further dimensional processing of the blade unit. Further, the system facilitates monitoring of the assembly process at numerous points. In accordance with such feature there is provided apparatus for assembling a blade unit having a plurality of blade components. The apparatus includes support structure having two spaced alignment surfaces and two sets of biasing structure each set being arranged to apply a biasing force on a corresponding blade element to urge the end portions of the shaving edge into engagement with corresponding aligning surfaces of the nest, structure for applying a series of spaced welds to the stacked blade elements while they are maintained in clamped aligned relation, transfer structure for removing the blade unit from the nest and structure for operating the loading structures, the biasing elements and the securing structure and the unloading structure in a coordinated relation to load, align, weld and unload the welded blade unit from the nest.

Other features of the invention include arrangements for sequential welding with limited electrical current, auxiliary clamping mechanism employed during an initial welding sequence, monitoring arrangements that are coordinated with the operation of unload and reject mechanisms, and particular nest configurations with spaced aligning surfaces and ports through which welding electrodes and unload mechanism elements are passed.

In a particular embodiment, the support structure includes two spaced sets of aligning surfaces offset from one another against which the forward edges of the blade components are urged by individual biasing elements that cooperate with the support structure. A series of support structures are provided on a carrier that moves the support structures past a series of operation stations, those operating stations including a first blade unit loading mechanism, a first sensing station, a second blade unit component loading station, a second sensing station, a series of welding stations, an unloading station, and a reject station. The apparatus is operable to assemble blade units with the requisite precision at a rate of more than 60 blade units per minute.

Other objects, features and advantages of the invention will be seen as the following description of a particular embodiment progresses, in conjunction with the drawings, in which.

DESCRIPTION OF PARTICULAR EMBODIMENT

Figure 1:
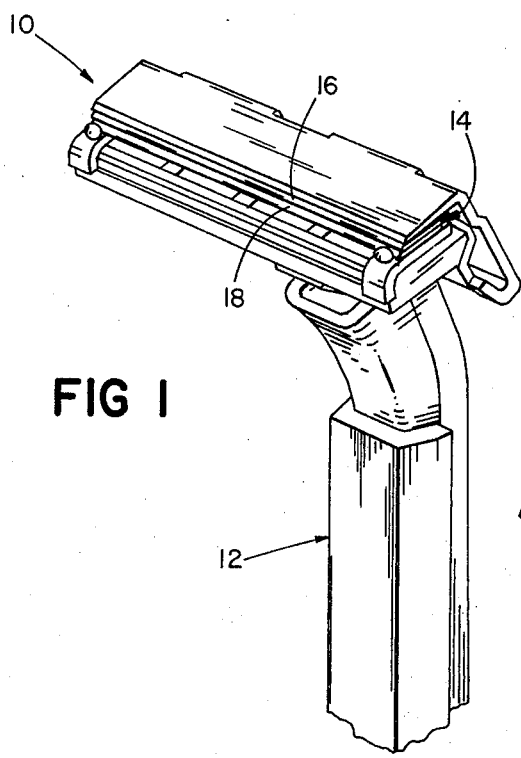
FIG. 1 is a perspective view of a shaving system in which blade units manufactured in accordance with the invention may be used.
Figure 2:
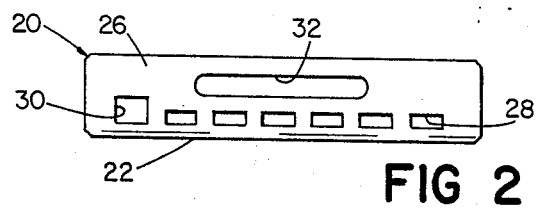
FIG. 2 is a plane view of a blade component of the blade unit.
Figure 3:
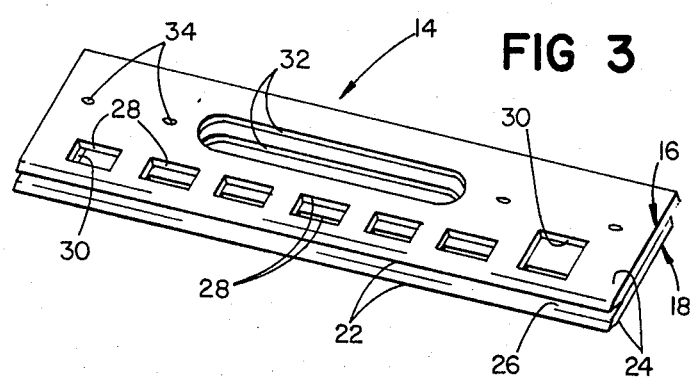
FIG. 3 is a perspective view of a blade unit manufactured in accordance with the invention.

The shaving system 10 shown in FIG. 1 includes a razor 12 of the injector type which receives a blade unit 14 from a blade dispenser (not shown). As shown more particularly in FIGS. 2 and 3, each blade unit 14 is composed of two identical members 16 and 18. Each member 16, 18 is a thin plate 20 several times longer than it is wide. (In this particular embodiment each plate is 1.495 inch long, 0.315 inch wide, and 0.01 inch thick.) A sharp cutting edge 22 is formed along one of the longer sides of each plate 20. Edge 22 is asymmetrically formed with respect to a median plane through the plate so that it is parallel to faces 24 and 26 but spaced 0.002 inch from face 24 and 0.008 inch from face 26. A series of debris passage slots 28 (the end slot 30 being larger) pierce each plate as does elongated slot 32. Members 16 and 18 are permanently affixed to each other by spots welds 34 to form the plural edge blade unit 14, faces 26 being in engagement and cutting edges 24 being offset from one another such that the edges are permanently maintained parallel to one another at a distance of about 0.034 inch and in a plane disposed at an angle of about 23° to the faces 24, 26 of the blade elements 16, 18. When the blade unit 14 is inserted in the razor 12 as indicated in FIG. 1, member 18 provides the leading cutting edge, and member 16 provides the following cutting edge.

Figure 4:
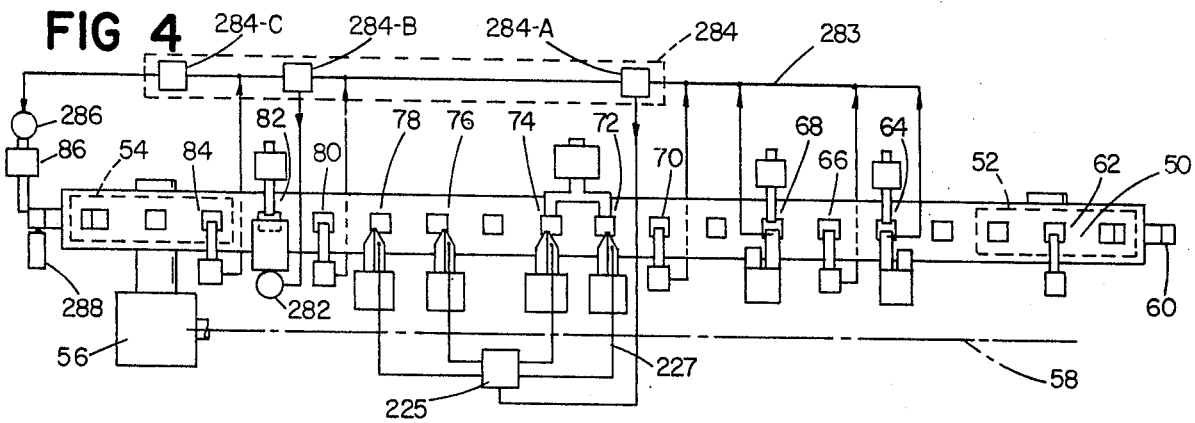
FIG. 4 is a diagrammatic plan view of a system for assembling blade units of the type shown in FIG. 3.

Apparatus which sequentially performs a series of steps to assemble the blade units in the requisite precise relation is shown diagrammatically in FIG. 4. As indicated in that figure, a transport belt 50 is trained over spaced cylinders 52, 54, cylinder 54 being intermittently driven by drive mechanism diagrammatically indicated at 56 in an indexing operation. Mechanism 56 also drives a cam shaft diagrammatically indicated at 58. A series of forty support structures 60 are secured on transport belt 50 in spaced relation. The support structures are sequentially moved past a series of stations that include an empty nest inspection station 62, a first blade element loading station 64, a first blade sensing station 66, a second blade unit loading station 68, a second blade sensing station 70, a series of four welding stations 72, 74, 76 and 78, a third sensing station 80, an unloading station 82, a fourth sensing station 84 and a reject station 86. The transport belt 50 and the mechanisms at the several stations are operated in coordination by cams driven by cam shaft 58 in coordination with the indexing of transport 50.

Figure 6:
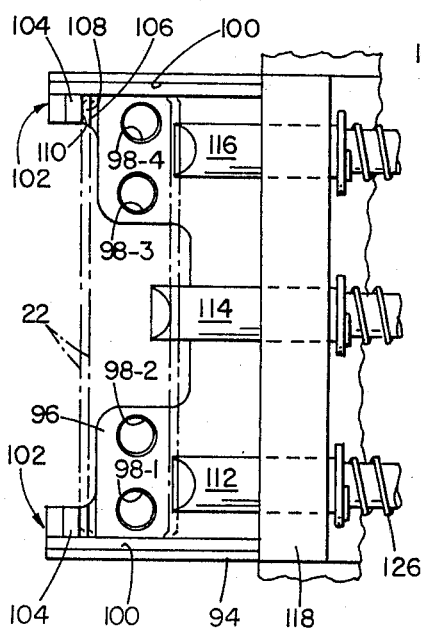
FIG. 6 is a plan view of a portion of the support shown in FIG. 5.
Figure 5:
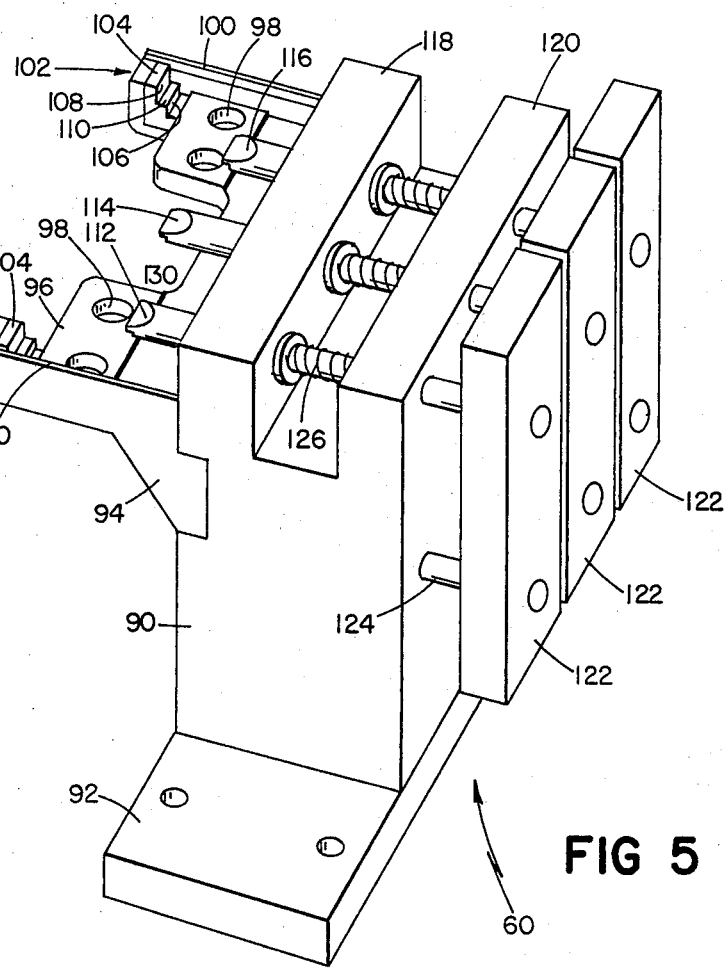
FIG. 5 is a perspective view of a support unit employed in the system shown in FIG. 4.

With reference to FIGS. 5 and 6, each support structure or nest 60 includes an upstanding body portion 90 from the base of which extends flange portions 92 which are secured to the transport belt 50. Mounted on the forward wall of body 90 and extending laterally therefrom is a support member 94 which has a planar support surface 96 in which are formed a series of four apertures 98, the upper and lower edges of which are chamferred. Support member 94 has an upwardly extending wall 100 at either end and an aligning structure 102 adjacent either side wall 100. Each aligning structure is a carbide insert 104 that has a lower vertical surface 106, a second vertical surface 108 that is spaced about 0.034 inch forwardly of surface 106. The horizontal transition surface 110 between surfaces 106 and 108 is positioned about 0.01 inch above support surface 96.

Also carried by body 90 are a set of three clamp rods or fingers 112, 114 and 116, each of which is supported in guide bores in upwardly extending flanges 118, 120 and is secured to a corresponding clamp plate 122. Also secured to each clamp plate 122 is a guide pin 124 which extends forwardly into the lower part of body structure 90. A spring 126 mounted on each rod between flanges 118, 120 acts to bias that rod forwardly. A contact surface 130 formed in the undersurface of the leading end of each pin is adapted to engaged the rear edge of a blade plate 20, pins 112 and 116 being arranged to engage the rear edge of blade 16 and urge that blade forward against aligning surfaces 106, each spring 126 on those pins providing 2.8 grams of biasing force; and the center pin 114 being arranged to engage the rear edge of blade 18 to urge that blade into engagement with the aligning surfaces 108, its spring providing a 4.7 grams of biasing force. The lateral positioning of the blades is guided by side walls 100.

Figure 7:
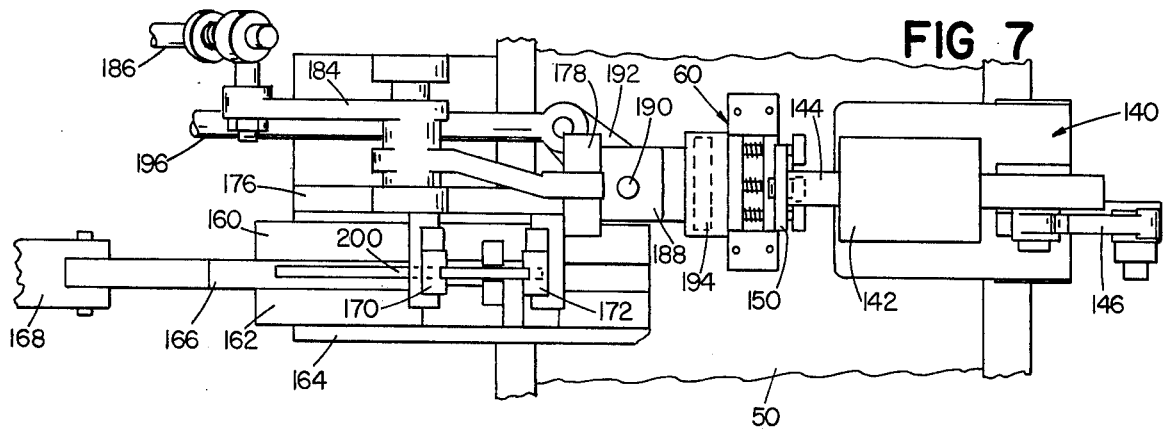
FIG. 7 is a plan view of apparatus at a blade loading station.
Figure 8:
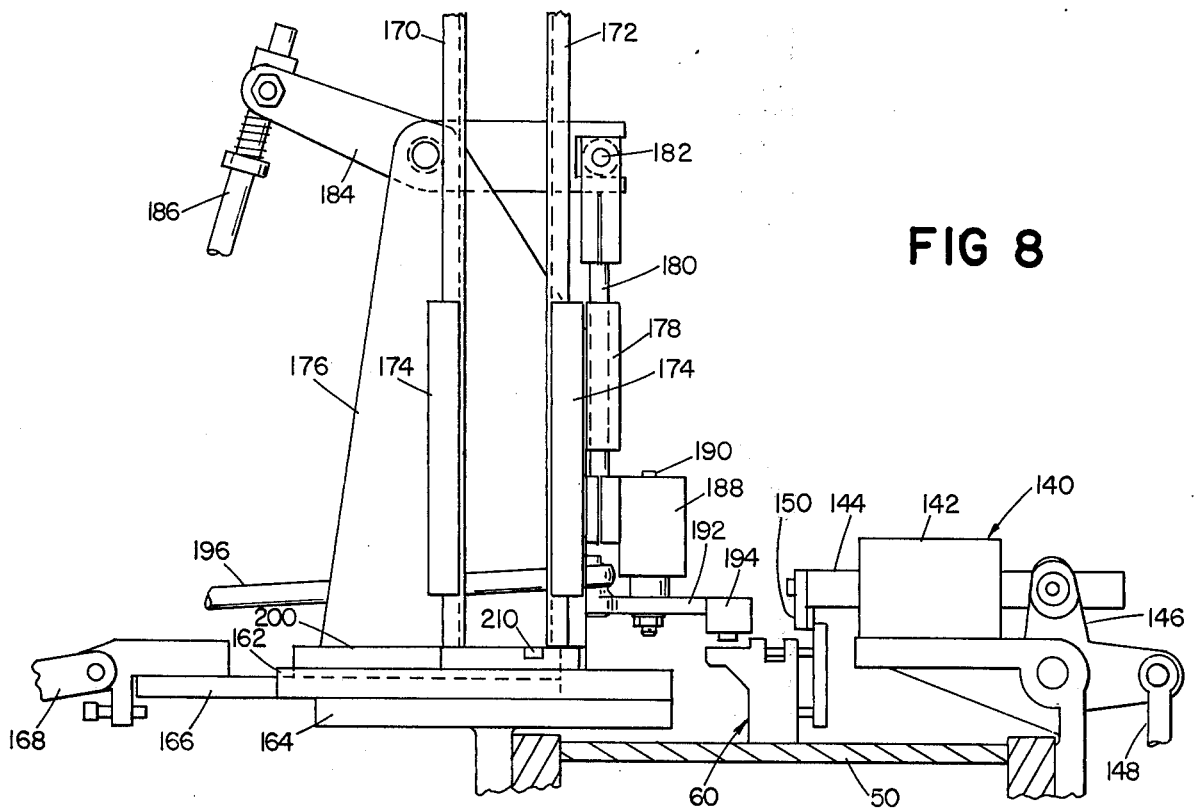
FIG. 8 is a side elevational view of apparatus shown in FIG. 7.
Figure 9:
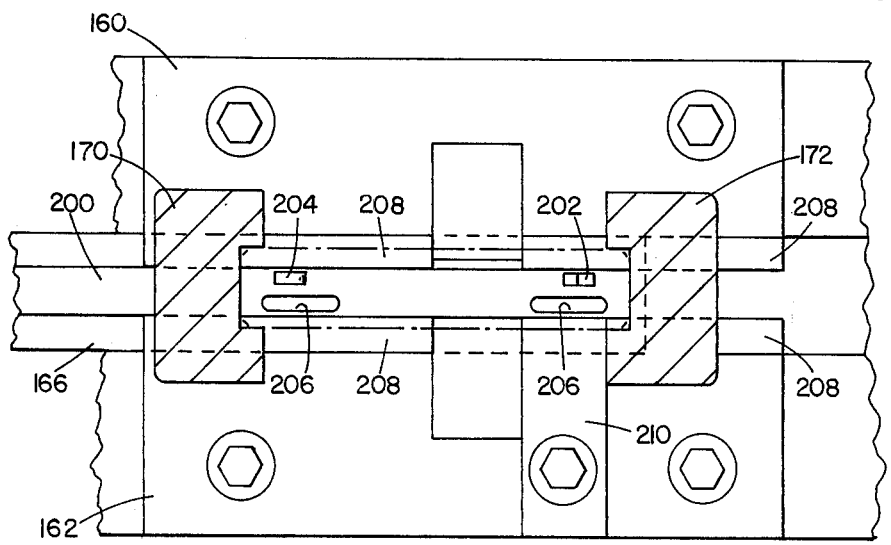
FIG. 9 is an enlarged plan view of a portion of the apparatus shown in FIG. 7.

Details of apparatus at blade loading station 64 are indicated in FIGS. 7–9. As shown in FIGS. 7 and 8, positioned to the rear of the nest 60 is a nest opening mechanism 140 which has a guide structure 142 in which bar 144 is mounted for reciprocation by crank 146. Crank 146 is in turn connected to push rod 148 which is actuated by nest opener cam. Depending finger structure 150 carried by bar 144 is arranged to engage the biasing pin actuators 122 and move them rearwardly in a nest opening movement.

On the opposite side of belt 50 from mechanism 140 is a blade feed and transfer mechanism that includes spaced guide members 160, 162 secured on support 164. Pusher bar 166, mounted for reciprocation between guide members 160, 162, is connected to drive link 168. Supported above guide member 160, 162 are opposied vertical guide channels 170, 172 that receive and support a stack of blades 16. The guide channels 170, 172 are supported by members 174 that are attached to support web 176. Also mounted on web 176 is guide 178 through which passes rod 180. The upper end of rod 180 is secured by pin 182 to arm 184 which is pivoted on web 176 and is actuated by rod 186 that is driven by the lift cam. Carried at the lower end of vertically reciprocable rod 180 is bearing assembly 188 that guides pivot shaft 190. Arm 192 is secured to shaft 190 and carries a vacuum blade transfer head 194 at its forward end, its rearward end being connected to actuating rod 196.

Pusher bar 166 includes an upwardly projecting central portion 200 as indicated in FIG. 9 in which is disposed a forward fixed drive projection 202, a rearward aligning projection 204 that is biased upwardly, and two vacuum ports 206. Pusher bar 166 is reciprocated between a rear position aligned with the guide channels 170, 172 (as indicated in FIG. 9) and a forward transfer position. The guide members 160, 162 each include carbide inserts 208, and a magnet 210 is positioned on the side adjacent the unsharpened edge of the blade 16.

In operation, a stack of aligned blades 16 with the larger aperture 30 at the forward end of the stack (closer to the conveyor 50) is placed in guide channels 170, 172 with the lowest blade being supported on carbide guides 208 and magnet 210 acting to urge the unsharpened edge of the blade laterally into an aligned position against side walls of the guide channels. The pusher mechanism when retracted has picker 202 in hole 30 and back locater 204 in the hole 28 at the other end of the blade; and the vacuum ports 206 in contact with the blade on either side of the elongated slot 32 (the margins of the blade resting on the carbide guide surfaces 208). Transfer head 194 is raised (in response to downward movement of rod 186) and rotated clockwise (as viewed in FIG. 7) by forward movement of push rod 196; and pusher arm 166 is then moved forward. Head 194 is then lowered into engagement with the blade carried by the pusher 166. The blade is transferred to the head 194 by vacuum and the head is then raised, rotated into position above the support member 94. Simultaneously with the counterclockwise rotation of the transfer head 194, the opening mechanism 140 is operated to retract the biasing pins 112, 114, 116. With the pins retracted, the transfer head 194 is lowered, the vacuum turned off, and a puff of air is supplied through ports in the transfer head 194 to deposit the blade on the support surface 96. The transfer head 194 is then raised and again rotated clockwise. Concurrently with such rotation, the cam drive for the nest opener mechanism 140 allows the aligning pins to move forward slowly urging the ends of the sharpened edge of the blade 16 forward against the aligning surfaces 106.

Belt 50 is then indexed, the presence of the blade 16 in the next is electrically sensed at station 66 and then the belt is indexed to the station 68 where similar blade loading apparatus is provided to transfer a blade 18 from a stack to the support structure where it is deposited on top of blade 16 and then urged into engagement with alignment surfaces 108 by pin 114. The positioning of the second blade 18 is electrically sensed at station 70.

Figure 17:
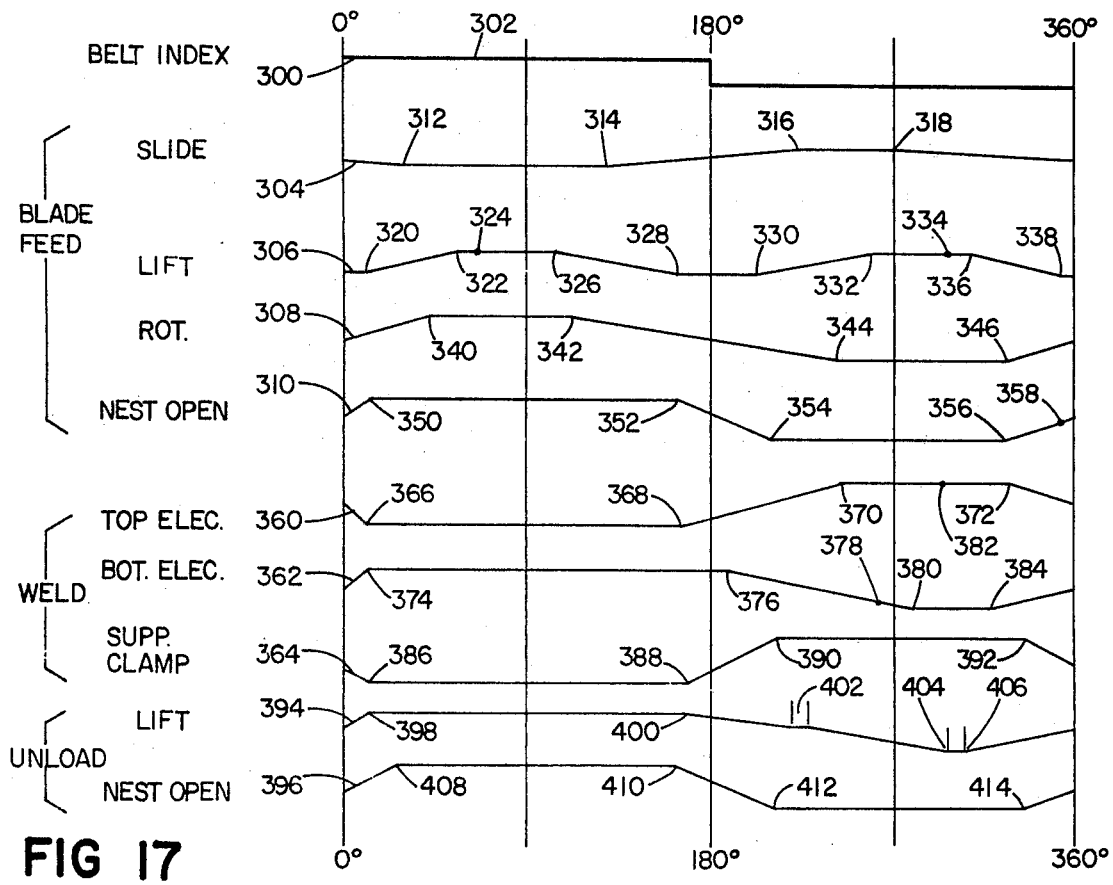
FIG. 17 is a timing diagram indicating a sequence of operations of the apparatus shown in FIG. 4.
Figure 10:
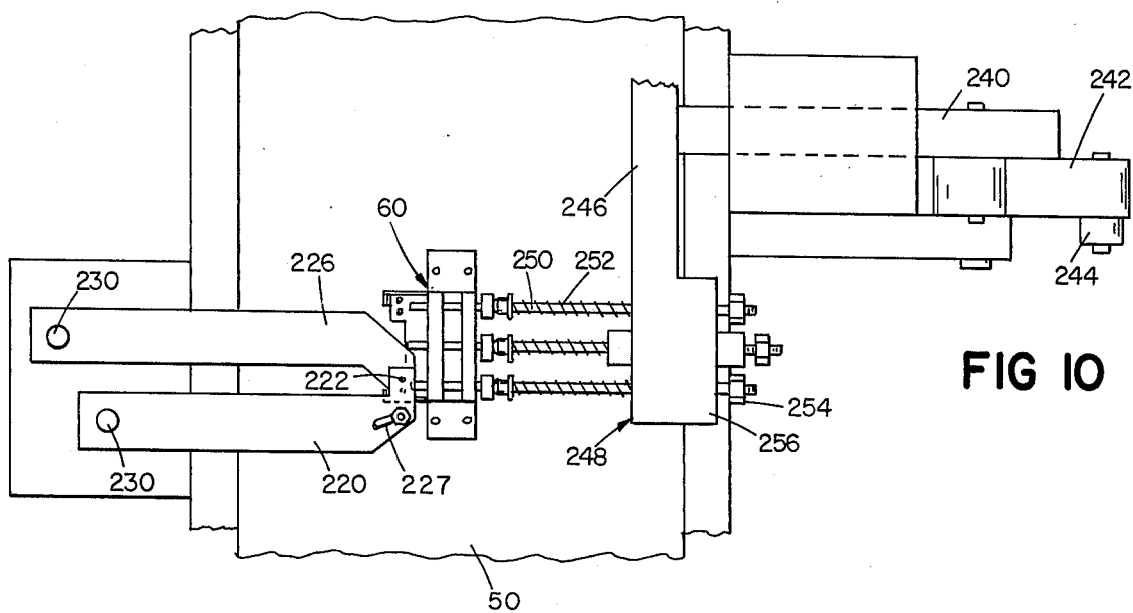
FIG. 10 is a view similar to FIG. 6 showing apparatus at a welding station.
Figure 11:
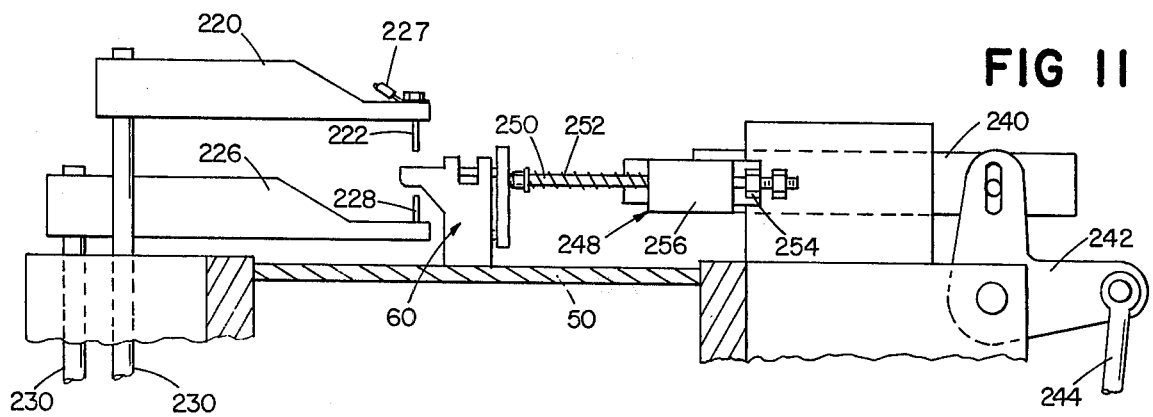
FIG. 11 is a side elevational view of the apparatus shown in FIG. 10.
Figure 12:
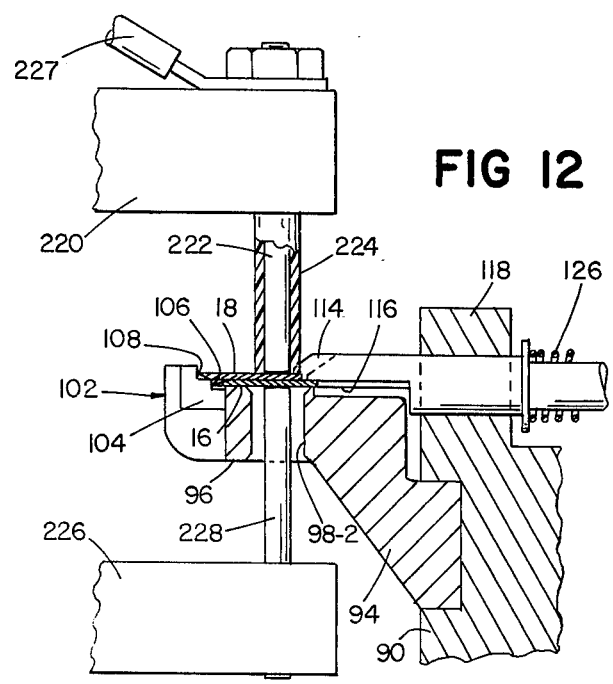
FIG. 12 is a sectional view on an enlarged scale of a portion of the apparatus at a welding station.

Details of apparatus at welding station 72 is shown in FIGS. 10-12. Similar apparatus is provided at welding stations 74, 76 and 78. That apparatus includes an upper support arm 220 which carries a downwardly extending welding electrode 222 that is optionally surrounded by a tubular shroud 224 of Tygon plastic. The plastic shroud 224 extends about 0.01 inch below the tip of electrode 222 and is under compression when the electrode is in engagement with the blade 18 as shown in FIG. 12. A cooperating lower electrode welding arm 226 carries an upwardly extending electrode 228. The tip of each welding electrode 222, 228 has a diameter of 0.007 inch and a spherical end surface of about 3 inches radius. The upper electrode 222 is coonnected to power supply 225 by cable 227 and the bottom electrode 228 is electrically grounded. The arms 220, 226 are mounted on vertically reciprocable rods 230 that are controlled by cams (not shown) mounted on cam shaft 58 in conventional manner in timed relation as indicated in FIG. 17. Also, at stations 72 and 74 is an auxiliary supplement clamping mechanism that includes a reciprocable ram 240 that is driven by crank 242 and rod 244. Ram 240 carries at its forward end a transverse member 246 and two sets 248 (only one of which is shown in FIG. 10) of supplemental clamp rods 250. Each clamp rod 250 is biased forwardly by spring 252, stop 254 cooperating with carrier 256 to limit the forward movement of the rod.

The welding electrodes at station 72 are positioned to pass through port 98-2, the electrodes at station 74 pass through port 98-3, the electrodes at station 76 pass through port 98-1, and the electrodes at station 78 pass through ports 98-4.

In each spot welding operation, after the nest 60 is indexed into position at a welding station, and supplemental clamping pressure (if provided) is applied, both welding electrodes 222, 228 are moved towards the components of the blade unit on the support surface, the upper electrode contacting the upper blade 18 first and being maintained in engagement with the upper blade under a pressure of nineteen pounds while the lower electrode 228 is moved up through the port 98 into subsequent engagement with the lower blade 16 and maintained in contact under a pressure of fifteen pounds.

The position of the electrodes 222, 228 and the aligning elements 112, 114, 116 during welding may be seen with reference to FIG. 12. In this position the plastic shroud 224 is in flexed engagement with the upper blade 18 and provides a shield. Electrical power is applied to the electrodes 222, 228 from power supply 225 to supply a current in the order of 400 amperes r.m.s. for a 17 millisecond cycle. Should a defect signal be generated by any one of stations 62, 66 or 70, the application of electrical power in each welding sequence is inhibited and the nest is emptied at station 86.

The welding sequence is repeated four times as indicated above to provide the four welds 34, two on either side of the elongated slot 32.

Figure 13:
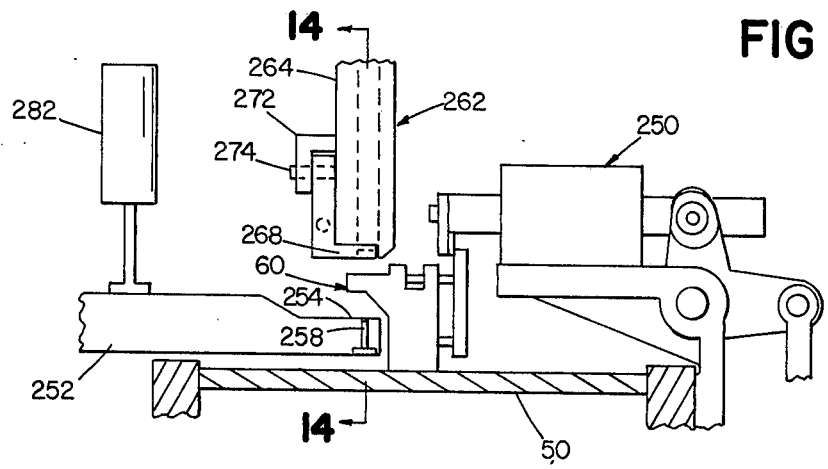
FIG. 13 is a side elevational view of apparatus at the unload station.
Figure 14:
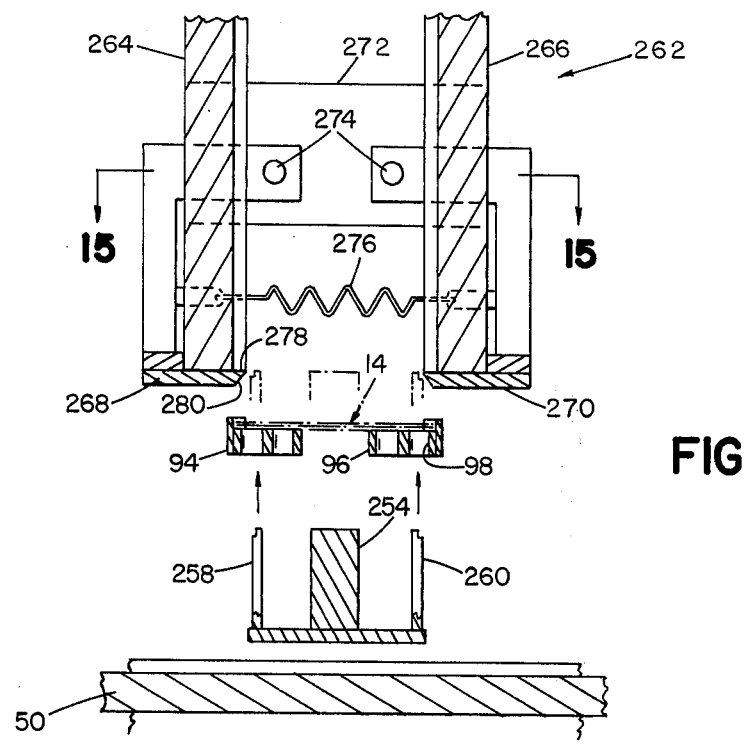
FIG. 14 is a sectional view taken along the line 14—14 of FIG. 13.
Figure 15:
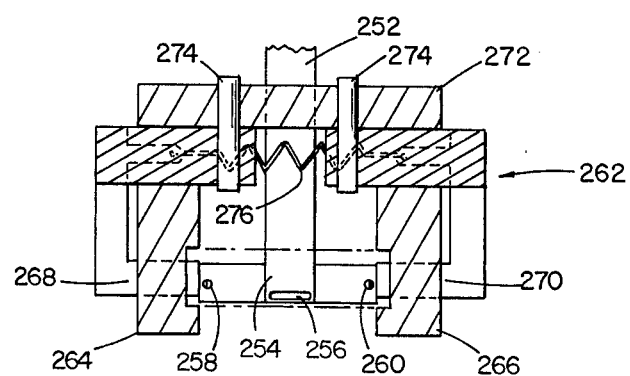
FIG. 15 is a sectional view taken along the line 15—15 of FIG. 14.

After welding has been completed, the nest 60 is indexed to inspection station 80 to check that the blade unit has not been displaced during the welding operation and then indexed to unloading station 82, details of which may be seen with reference to FIGS. 13-15. The mechanism at that station includes an unclamping mechanism 250 similar to unclamping mechanism 140 at the load stations 62 and 66; a lifting arm mechanism 252 that includes at its forward end a central post member 265 (FIG. 14) which has a vacuum portion 156 (FIG. 15) and two upstanding pins 258, 260, one on either side of the central post member; and a receiving stack structure 262. That stack structure includes guide channels 264, 266 and cooperating latch elements 268, 270. A bracket member 272 extends between channels 264, 266 and carries pivot shafts 274 on which the latch elements 268, 270 are pivotally mounted. Spring 276 extends between the latch elements and biases them inwardly. Each latch element includes a flat upper surface 278 that is normally disposed beneath the channel in blade stock supporting relation and a lower inclined cam surface 280.

Upward movement of lifter bar 252 may be inhibited by air cylinder 282 and operation of that air cylinder is coordinated with the signals from the sensing stations 62, 66, 70 and 80. Defect signals from those stations are stored in memory 284 (FIG. 4) that is stepped in each belt indexing operation and when each nest that has generated a defect signal is positioned at station 82 air cylinder 282 will be actuated in automatic sequence to prevent unloading. If the inhibit air cylinder 282 is not actuated, the lifter bar is raised as indicated in FIG. 14, inserting the pins 258 and 260 through ports 98-1 and 98-4 with the central post 254 engaging the center of the blade unit 14 which is secured there by vacuum. As the blade unit 14 rises, it contacts inclined cam surfaces 280 of the latch fingers 268, 270, camming those latch fingers outwardly against the inward biasing force of spring 276. With the fingers cammed outwardly, the stack of blade units in the guide channels 264, 266 is released and the entire stack is supported on the lifter bar 252. As the lifter bar 252 continues to move upward, the latch fingers snap under the blade unit on post 254 towards pins 258, 260. The lifter bar 252 is then lowered and the stack remains supported on the latch fingers. Further downward movement of the lifter bar 252 withdraws the pins 258, 260 from the ports 98 and the mechanism returns to its initial lowered position ready for the next indexing step of the conveyor.

Apparatus at the reject station 86 is coordinated in operation with the apparatus at the unload station 82. Thus, if an unload sequence is inhibited, a reject sequence will be performed. The reject sequence involves opening the aligning and clamping structure in manner similar to operation of mechanism 140, for example and applying an air blast to supplement the force of gravity to remove an improperly assembled blade unit from the nest. Such improper assembly may be due to the absence of one or more of the blades either to the failure of the transfer as sensed by vacuum pressure at stations 64 and 68, misplacement of one or more of the blades in the nest as sensed at sensor stations 66 and 70, misplacement of a blade unit after welding at station 78 as sensed at station 80, or failure of the unload mechanism to properly transfer a blade unit from the nest 60 as sensed at station 84. Defect signals are transmitted from those sensors over line 283 and are stored in memory 284 which is stepped in synchronisum with the indexing of conveyor 50. The application of welding current at each welding station is inhibited if a defect signal is generated at any one stations 64, 66, 68 or 70 by an output from memory 284A; and operation of the unload mechanism is inhibited if a defect signal has been generated at any one of those stations or station 78 by an output from memory 284B. Defect signals from station 84 are loaded into memory 284C and are used to indicate the mechanism a reject station 86 to remove a blade that remains in the nest due either to inhibiting of the unload or failure of that mechanism to properly transfer a blade unit from the nest to the stack of blade units in guide channels 264, 266. The mechanism at reject station 86 includes a nest opener mechanism similar to mechanism 140 that is operated by air cylinder 286 and an air blast nozzle 288 both of which respond to a signal from memory 284C and operate to remove a blade or blade unit from the nest 60.

Figure 16:
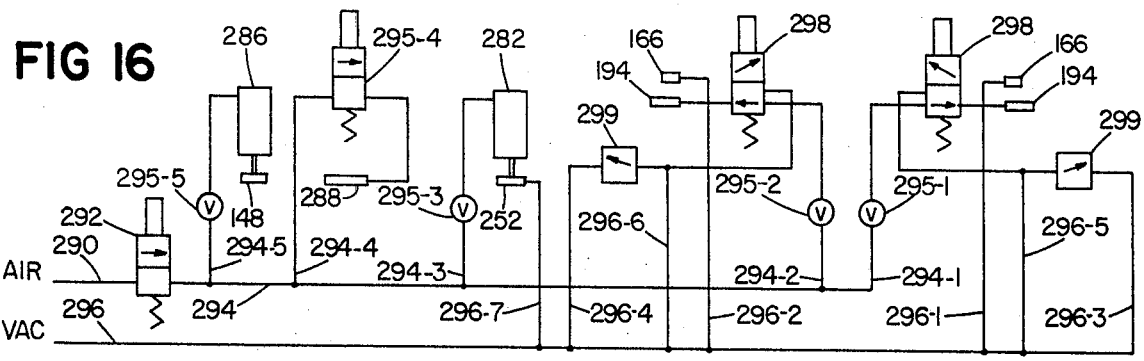
FIG. 16 is a diagram of the air and vacuum system employed with the apparatus shown in FIG. 4.

A diagram of the air and vacuum system employed with the apparatus shown in FIG. 4 is shown in FIG. 16. Air pressure is supplied over line 290 through filter and regulator and the control valve 292 to stations 64 (line 294-1), 68 (line 294-2), 82 (line 294-3) and 86 (lines 294-4 and 294-5 as controlled by valves 295). Vacuum is applied over line 296 to maintain vacuum to the transfer arms 194 lines 296-3, 296-4 (low vacuum) and 296-5 and 296-6 (high vacuum) via control valves 298; and over line 296-7 to port 256 on lifter bar 252. At the blade loading stations, vacuum is continuously applied to ports 206 of pusher 166; and vacuum is controllably applied to transfer arm 194 under the control of solenoid valve 298 and selector 299. In the first position of the solenoid valve (as shown) air pressure is applied when valve 295-1 is opened to transfer the blade from the transfer head 194 to the nest. In the second position of valve 298, vacuum is applied to the transfer arm 194 under the control of a vacuum differential switch 299.

At unload station 82, vacuum is continuously applied to port 256 of lifter bar 252 and operation of cylinder 282 is controlled by switch 295-3 in response to a signal from memory 284. At the reject station 86, the nest 60 is opened on command by air cylinder 286 and solenoid valve 295-4 is opened to apply air pressure to blow off nozzle 288 to positively remove the blade from the nest.

The timing diagram shown in FIG. 17 indicates the timing relationships of certain of the drive cams employed in the coordinated indexing and operation of stations in this system. The motion of the cam that controls the indexing of the conveyor is indicated at 300, the support structures 60 being indexed from one station to the next as the cam shaft 84 moves from 0° to 180° as indicated by portion 302. The path of the cams that controls the pusher bars 166 at stations 62 and 66 is indicated at 304, the path of the cams that controls the lifting of the transfer head 194 at those stations is indicated at 306, the path of the cams that controls the rotation of the transfer head 194 is indicated at 308, and the path of the cam that controls the operation of the nest opener mechanisms 140 is indicated at 310.

The forward movement of pusher bar 166 terminates at 30° of shaft rotation (point 312) and that bar remains stationary until 130° rotation (point 314). The bar is then retracted to 225° rotation (point 316) where the pusher bar is positioned under the stack, and then commences to advance at 270° rotation (point 318). The transfer head 194 as controlled by cam 306 commences downward movement at point 320 and terminates downward movement at point 322 (55°). Vacuum is turned on at point 324; upward movement of the head commences at point 326 (105°) and ceases at point 328 (165°). Downward movement commences at point 330 (200°) and stops at point 332 (260°). At point 334 the vacuum is turned off and a puff of air is applied to force the blade away from the transfer head onto the support surface. At point 336 (305°) the head starts again to be raised and then stops the upward motion at point 338 (350°). The rotation of the transfer head 194 is controlled by cam 308, the head being rotated into position over extended pusher bar 166 with rotation terminating at point 340 (40°) and rotation in the reverse direction commencing at point 342 (115°) and terminating at point 344 (240°) where the head is over the support surface 94. Return rotation commences at point 346 (320°). The nest opening cam 310 is moved into its fully advanced position at point 350 (15°) and commences to move rearwardly in a nest opening operation at point 352 (165°) and reaches a fully opened position at point 354 (220°). Release of the opening mechanism commences at point 356 (320°), the cam being designed to provide a gentle closing force with a zero velocity zero acceleration characteristic at point 358.

Mechanical movements in the welding sequences are also coordinated and controlled by cams the mechanical motions of the two electrodes and the supplemental clamping are being controlled by cams 360, 362, 364, respectively. The cam indicated by line 360 controls motion of the upper electrode 222, that electrode being fully raised at point 366, downward movement being started at point 368 (165°), the electrode being fully down at point 370 (245°) and commenced to be raised again at point 372 (325°). The lower electrode 228 is fully retracted at point 374 (10°), commences to be raised at point 376 (190°) (the upward motion process being modified to provide a general contact with the blades with a transition control occurring at the point 378 (260°)); the upper travel of lower electrode 228 stops at point 380 (280°); and the welding power supply is energized at point 382 (290°). Twenty-five degrees of cam rotation later at point 384 (315°) the lower electrode 228 starts to move downward. The supplemental clamping employed at stations 70 and 72 is controlled by cam 364 which is fully retracted at point 386 (10°), starts to move forward at point 388 (165°); is fully forward at point 390 (220°); and starts to retract at point 392 (335°).

The cams that control operations at unloading station 82 are indicated by lines 394 and 396, cam 394 controlling the lifter arm 252 and cam 396 controlling the opener mechanism 250. Cam 394 is in its lower position at point 398 (10°) and starts to rise at point 400 (170°), stops upward motion for a 5° interval at point 402 (220°-225°) the point at which the lifter bar contacts the blades; and has moved past the latch jaws 268, 270 at point 404 (295°) and starts to descend at point 406 (300°). Vacuum is on throughout the entire cycle. The nest opening cam 396 is fully advanced at point 408 (25°) starts to retract at point 410 (165°); is fully retracted (the nest fully open) at point 412 (220°); and starts to advance at point 414 (335°).

While a particular embodiment of the invention has been shown and described, various modifications thereof will be apparent to those skilled in the art and therefore it is not intended that the invention is limited to the disclosed embodiment or to details thereof and departures may be made therefrom within the spirit and scope of the invention as defined in the claims.

What is claimed is:

1. Apparatus for assembling a blade unit comprising: support structure for receiving and holding in aligned position a first blade component, first aligning structure for applying an aligning force to said first blade component to maintain its cutting edge in predetermined position, second aligning structure for applying an aligning force to a second blade component disposed on said first blade component to maintain its cutting edge in predetermined position offset from the cutting edge of said first blade component, structure for bonding the two blade components permanently together, transfer structure for releasing said aligning forces and transferring the assembled blade unit from the support structure, and common drive structure for operating said aligning, bonding and transfer structures in coordinated relation to align and bond said blade components to form said blade unit.

2. The apparatus as claimed in claim 1 wherein said support structure has two spaced sets of aligning surfaces, each said set including first and second aligning surfaces disposed in offset relation and said first and second aligning structures are arranged to urge edge portions of said first and second blade components into engagement with said first and second aligning surfaces, respectively, of each said pair.

3. The apparatus as claimed in claim 1 wherein said bonding structure includes structure for applying a set of spaced welds to said two blade components to permanently bond the two blade components together with said cutting edges in said predetermined offset position.

4. The apparatus as claimed in claim 1 wherein said bonding structure includes a plurality of pairs of juxtaposed welding electrodes, a first drive for one electrode of each pair to move said one electrode into contact with one blade component, a second drive for the other electrode of each pair to move said other electrode into contact with the other blade component, and electrical power supply means for applying welding current to said pairs of electrodes, said common drive structure operating said first and second electrode drives and said power supply means in coordinated relation to bond the two blade components permanently together.

5. The apparatus as claimed in claim 1 wherein said transfer structure includes a receiving channel having latch fingers to secure a blade unit in said channel and a transfer arm for transporting an assembled blade unit from said support structure into said receiving channel into engagement with said latch fingers.

6. The apparatus as claimed in claim 1 and further including reject structure, sensor structure for sensing failure of said transfer structure to remove a blade unit from said support structure, said reject structure being responsive to said sensor structure for removing blade unit components from said support structure.

7. The apparatus as claimed in claim 1 and further including a plurality of sensors, first inhibit mechanism operative in response to a signal from one of said sensors for inhibiting the operation of said bonding structure and second inhibit mechanism operative in response to a signal from one of said sensores for inhibiting operation of said transfer structure.

8. Apparatus for assembling a blade unit having a plurality of blade components comprising support structure having two spaced alignment surfaces and two sets of biasing structures, each said set being arranged to apply a biasing force on a corresponding blade element to urge the end portions of the shaving edge into engagement with corresponding aligning surfaces of said support structure, structure for applying a series of spaced welds to a stack of blade elements while they are maintained in clamped aligned relation in said support structure to form a blade unit, transfer structure for removing said blade unit from said support structure, and structure for operating said biasing structures, said welding structure and said transfer structure in a coordinated relation to load, align, weld and unload said welded blade unit from said support structure.

9. The apparatus as claimed in claim 8 wherein said support structure includes two spaced sets of aligning surfaces offset from one another against which the forward edges of the blade components are urged by individual biasing elements that cooperate with said support structure.

10. The apparatus as claimed in claim 8 wherein a series of support structures are provided on a carrier that moves said support structures past a series of operation stations, said operation stations including a first blade unit component loading mechanism, a first sensing station, a second blade unit component loading station, a second sensing station, a series of welding stations, an unloading station, and a reject station.

11. The apparatus as claimed in claim 10 wherein each said blade unit loading mechanism includes a supply for positioning blade components in stacked relation, pusher mechanism for transfering blade components from said stack supply one at a time, and transfer mechanism for transferring a blade component from said pusher mechanism to said support structure.

12. The apparatus as claimed in claim 8 wherein said welding structure includes a plurality of spaced stations, each said station including a pair of juxtaposed welding electrodes, one electrode being disposed on one side of the blade elements in the support structure and the other electrode being disposed on the other side of the blade elements in the support structure, drive for positioning said electrodes so that said one electrode contacts a blade in the support structure before said other electrode; and power supply control for applying welding current for a fraction of a second for flow between said electrodes through the blade elements to spot weld the blade elements together.

13. The apparatus as claimed in claim 12 and further including supplemental clamping structure at at least one of said welding stations for supplementing the biasing force applied by said biasing structures during the application of welding current to said welding electrodes.

14. The apparatus as claimed in claim 8 and further including two blade element loading mechanisms, each said loading mechanism includes guide structure for receiving a stack of blade elements; pusher mechanism for slicing a blade element from the lower end of said stack, said pusher mechanism including a drive projection adapted to engage a first hole in the blade element, an aligning projection adapted to engage a second hole in the blade element, and a vacuum port for assisting to maintain the blade element sliced from the stack on the pusher mechanism; and transfer mechanism for transferring the blade element from the pusher mechanism to the support structure and wherein said operating structure operates said pusher and transfer mechanisms in coordinated sequence.

15. The apparatus as claimed in claim 14 and further including a vacuum source and wherein each said loading mechanism includes a pusher mechanism having a vacuum port connected to said vacuum source and a cooperating transfer mechanism having a vacuum port connected to said vacuum source; the mechanism at said unloading station has a port connected to said vacuum source for facilitating blade transfer.

16. The apparatus as claimed in claim 8 and further including a plurality of sensors, and structure cooperating with said welding structure and said transfer structure for selectively inhibiting operation of said welding structure and said transfer structure in response to signals from said sensors.

17. The apparatus as claimed in claim 8 wherein a series of said support structures are provided on a conveyor belt, and further including an indexing drive for moving said support structures past a series of operation stations, said operation stations including first and second blade unit component loading mechanisms, each said loading mechanism including structure for receiving a stack of razor blades, pusher mechanism for slicing the bottom razor blade from said stack, and transfer mechanism for transferring the sliced razor blade from said pusher mechanism for said support structure positioned at said loading station, a series of welding stations, each said welding station including upper and lower electrodes in juxtaposed position, drive mechanism for moving said welding electrodes towards one another into contact with blade components held on a support structure positioned at the welding station and power supply for supplying welding current to form a spot weld of the two blades together, said series of welding stations being arranged to form a series of spot welds at spaced locations along the length of the stack of blade elements;

an unloading station which includes said transfer structure, said transfer structure including a lifter mechanism operative to lift a welded blade unit from said support structure and a stacking structure arranged to receive a welded blade unit from said lifter mechanism, said stacking structure including resiliently biased latch elements past which a welded blade unit is cammed by said lifter mechanism for securing in said stack structure; and a reject station which includes mechanism for removing blade unit components from each support structure if the blade unit component is not removed by said transfer structure at said unloading station.

18. The apparatus as claimed in claim 17 and further including a plurality of sensor stations, first inhibiting mechanism operative in response to a signal from one of said sensor stations for inhibiting operation of welding at said welding stations, second inhibiting mechanism operative in response to a signal from one of said sensor stations for inhibiting unload at said unloading station and wherein operation of mechanism at said reject station is responsive to a signal from one of said sensor stations.

19. The apparatus as claimed in claim 18 and further including a vacuum source and wherein each said loading mechanism includes a pusher mechanism having a vacuum port connected to said vacuum source and a cooperating transfer mechanism having a vacuum port connected to said vacuum source; the mechanism at said unloading station has a port connected to said vacuum source for facilitating blade transfer.

* * * * *

UNITED STATES PATENT AND TRADEMARK OFFICE
CERTIFICATE OF CORRECTION

PATENT NO. : 3,881,082
DATED : April 29, 1975
INVENTOR(S) : Robert H. Pasquale et al.

It is certified that error appears in the above-identified patent and that said Letters Patent are hereby corrected as shown below:

In the Assignee, change "Gillette Park" to --Boston--.
Column 3, line 47, change "spots" to --spot--.
Column 4, line 13, change "extends" to --extend--;
         line 37, change "engaged" to --engage--;
         line 64, change "opposied" to --opposed--.
Column 6, line 6, change "0.007" to --0.07--;
         line 7, change "coonnected" to --connected--;
         line 62, change "265" to --254-- and change "156" to --256--.
Column 7, line 6, change "stock" to --stack--;
         line 55, change "chronisum" to --chronism--;
         line 63, change "indicate" to --actuate-- and change "a" to --at--.
Column 9, line 55, change "is" (second occurrence) to --be--.
Column 11, line 22, change "transfering" to --transferring--.

Signed and Sealed this twenty-third Day of September 1975

[SEAL]

Attest:

RUTH C. MASON
Attesting Officer

C. MARSHALL DANN
Commissioner of Patents and Trademarks